US011119225B2

(12) United States Patent
Shimizu et al.

(10) Patent No.: US 11,119,225 B2
(45) Date of Patent: Sep. 14, 2021

(54) MEASURING DEVICE AND MEASURING METHOD

(71) Applicant: Olympus Corporation, Hachioji (JP)

(72) Inventors: Hidenori Shimizu, Machida (JP); Yuji Nakamura, Kunitachi (JP); Shinsuke Tsuboi, Sagamihara (JP); Tatsunori Sasaki, Hachioji (JP); Hiroaki Fujikane, Hachioji (JP)

(73) Assignee: Olympus Corporation, Tokyo (JP)

( * ) Notice: Subject to any disclaimer, the term of this patent is extended or adjusted under 35 U.S.C. 154(b) by 378 days.

(21) Appl. No.: 16/281,058

(22) Filed: Feb. 20, 2019

(65) Prior Publication Data

US 2019/0265368 A1   Aug. 29, 2019

(30) Foreign Application Priority Data

Feb. 27, 2018   (JP) .............................. JP2018-032981

(51) Int. Cl.
*G01S 19/49* (2010.01)
*G01S 19/34* (2010.01)
*G01C 21/30* (2006.01)
*G01C 21/16* (2006.01)

(52) U.S. Cl.
CPC ............ *G01S 19/49* (2013.01); *G01C 21/165* (2013.01); *G01C 21/30* (2013.01); *G01S 19/34* (2013.01)

(58) Field of Classification Search
CPC ....... G01S 19/49; G01S 19/34; G01C 21/165; G01C 21/30
See application file for complete search history.

(56) References Cited

U.S. PATENT DOCUMENTS

| 2009/0156230 A1* | 6/2009 | Versteeg ............... G01S 5/0252 455/456.1 |
| 2009/0156231 A1* | 6/2009 | Versteeg ............... G01S 5/0252 455/456.1 |
| 2012/0245846 A1 | 9/2012 | Yoshida |
| 2013/0137450 A1* | 5/2013 | Dai .......................... G01S 19/48 455/456.1 |
| 2014/0364100 A1* | 12/2014 | Marti ...................... G06F 9/445 455/418 |
| 2015/0099469 A1* | 4/2015 | Goldstein ............... H04L 67/24 455/41.2 |

(Continued)

FOREIGN PATENT DOCUMENTS

JP         09-189564 A       7/1997

*Primary Examiner* — Hussein Elchanti
(74) *Attorney, Agent, or Firm* — John C. Pokotylo; Pokotylo Patent Services (57) ABSTRACT

A measuring device capable of referring to map information, comprising: a first position measuring circuit for measuring a position of the device by receiving a signal transmitted from a positioning satellite; a power source circuit for supplying a power source to the first position measuring circuit; and a processor configured to suspend, in a case of determining that measurement using the first position measuring circuit is not possible, supply of a power source to the first position measuring circuit when determining that a position of the device is indoors based on a latest measurement result by the first position measuring circuit before it is determined that the measurement using the first position measuring circuit is not possible, and the map information.

10 Claims, 5 Drawing Sheets

(56) References Cited

U.S. PATENT DOCUMENTS

| | | | |
|---|---|---|---|
| 2015/0279213 A1* | 10/2015 | Balter | G01C 21/36 |
| | | | 705/13 |
| 2017/0192101 A1* | 7/2017 | Cho | G01S 19/39 |
| 2018/0091946 A1* | 3/2018 | Venkatraman | H04L 43/065 |
| 2018/0143325 A1* | 5/2018 | Park | G01S 19/074 |

* cited by examiner

MEASURING DEVICE AND MEASURING METHOD

CROSS-REFERENCE TO RELATED APPLICATIONS

Benefit is claimed, under 35 U.S.C. § 119, to the filing date of prior Japanese Patent Application No. 2018-032981 filed on Feb. 27, 2018. This application is expressly incorporated herein by reference. The scope of the present invention is not limited to any requirements of the specific embodiments described in the application.

BACKGROUND OF THE INVENTION

1. Field of the Invention

The present invention relates to a measuring device and a measuring method, both for measuring the position of a mobile device in a mobile device, such as a camera.

2. Description of Related Art

Conventionally, a mobile device that detects an absolute position by using the GPS (Global Positioning System) is known (for example, see Japanese Patent Laid-Open No. 2012-198097 (hereinafter, referred to as "Patent Document 1")). Further, a position detecting device has been proposed, for detecting the position and moving speed of a device almost continuously by using a gyro sensor or an acceleration sensor in a case where it is not possible to detect the position by the GPS (for example, see Japanese Patent Laid-Open No. 9-189564 (hereinafter, referred to as "Patent Document 2")).

Normally, the power source of a mobile device is a built-in battery, and therefore, it is desirable to prevent power from being wasted. The object of the position detecting device disclosed in Patent Document 2 is to improve the accuracy of detection of the moving speed and position, but reduction in power consumption is not described. Further, the mobile device disclosed in Patent Document 1 is regarded, in a case where the current position is detected by the GPS and there is no change in the detected position for a predetermined time or more, as the mobile device is located in a zone of life. In a case where a mobile device is located in a zone of life, satellite positioning (also referred to as positioning in the followings) with a high accuracy is not necessary, and therefore, the positioning period is made longer than usual and thus power consumption is reduced.

As described previously, the mobile device disclosed in Patent Document 1 uniformly is regarded, in a case where the detection results by the GPS do not change for a predetermined time or more, as the mobile device is located in a zone of life. However, by this method, it is hard to say that the positioning period is changed by taking the actual environment into consideration.

SUMMARY OF THE INVENTION

The present invention provides a measuring device and a measuring method, both capable of reducing power consumption by taking the actual environment in which a mobile device is located into consideration.

The measuring device according to a first aspect of the present invention is a measuring device capable of referring to map information, the measuring device, comprising: a first position measuring circuit for measuring a position of the device by receiving a signal transmitted from a positioning satellite; a power source circuit for supplying a power source to the first position measuring circuit; and a processor configured to suspend, in a case of determining that measurement using the first position measuring circuit is not possible, supply of a power source to the first position measuring circuit when determining that a position of the device is indoors based on a latest measurement result by the first position measuring circuit before it is determined that the measurement using the first position measuring circuit is not possible, and the map information.

The measuring device according to a second aspect of the present invention, comprising: a first position measuring circuit for measuring a position of the device by receiving a signal transmitted from a positioning satellite; a second position measuring circuit for measuring a position of each point of a movement path by continuously detecting a movement direction and a movement amount of the device and accumulating the movement direction and the movement amount in position data of a predetermined point; and a processor configured to perform, in a case of determining that measurement by the first position measuring circuit is not possible in a state where the measurement of the first position measuring circuit is performed at a predetermined period, the measurement of the first position measuring circuit at a second period longer than the predetermined period in a case of determining that the device is not moving based on measurement by the second position measuring circuit.

The measuring method according to a third aspect of the present invention is a measuring method in a measuring device capable of referring to map information, the measuring method, comprising the steps of: performing first position measurement to detect a position of the device by receiving a signal transmitted from a positioning satellite; supplying a power source for performing the first position measurement; and suspending, in a case of determining that the first position measurement is not possible, supply of a power source for performing the first position measurement when determining that a position of the device is indoors based on a result of the first position measurement acquired latest and the map information.

The measuring method according to a fourth aspect of the present invention is a measuring method in a measuring device capable of referring to map information, the measuring method, comprising the steps of: performing first position measurement to detect a position of the device by receiving a signal transmitted from a positioning satellite; performing second position measurement to detect a position of each point of a movement path by continuously detecting a movement direction and a movement amount of the device and accumulating the movement direction and the movement amount in position data of a predetermined point; and performing, in a case of determining that the first position measurement is not possible in a state where the first position measurement is performed at a predetermined period, the first position measurement at a second period longer than the predetermined period in a case of determining that the device is not moving based on results of the second position measurement.

DETAILED DESCRIPTION OF THE PREFERRED EMBODIMENTS

In the following, an example is explained as an embodiment of the present invention, in which the present invention is applied to a digital camera (hereinafter, referred to as a "camera"). This camera has an image capturing section, converts a subject image into image data by the image capturing section, and displays, as a live-view display, the subject image on a display section arranged at the rear of the main body based on the converted image data. A photographer determines a composition or shutter timing by observing the live-view display. At the time of a release operation, image data is stored in a storage medium. It is possible to reproduce and display the image data stored in the storage medium on the display section by selecting a reproduction mode.

Figure 2:
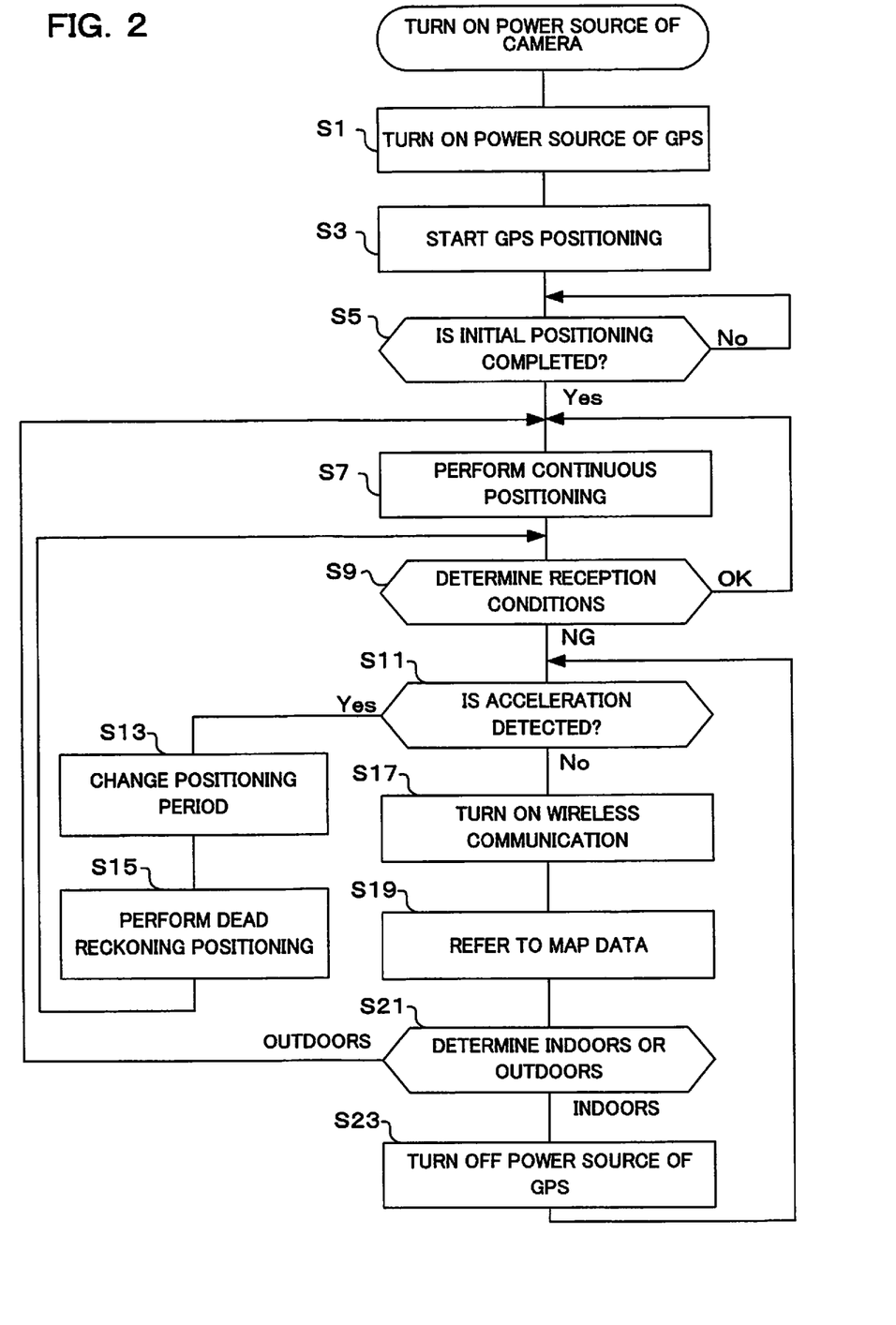
FIG. 2 is a flowchart showing an operation of the digital camera according to the embodiment of the present invention.

Further, this camera measures a position by the so-called GPS by receiving a signal transmitted from a positioning satellite (for example, see S7 in FIG. 2). In a case where the position measurement by the GPS is not possible (for example, see S9 in FIG. 2), the camera refers to a latest position measured by the GPS on a map (for example, see S19 in FIG. 2). In a case of determining that the camera is located indoors based on results of the reference on the map, supply of power to a GPS module is suspended (for example, see S21, S23 in FIG. 2). Due to this, it is possible to prevent power from being wasted.

Further, in a case where the position measurement by the GPS is not possible, the camera detects the current position based on detection results by an acceleration detection section or the like (for example, see S15 in FIG. 2). There is a possibility that positioning by the GPS becomes possible because the conditions change after the position measurement by the GPS becomes not possible, and therefore, the camera determines reception conditions for the GPS (for example, see S9 in FIG. 2). In this state, the period at which positioning is performed by the GPS is lengthened (for example, S13 in FIG. 2), so that power is prevented from being wasted.

Figure 5:
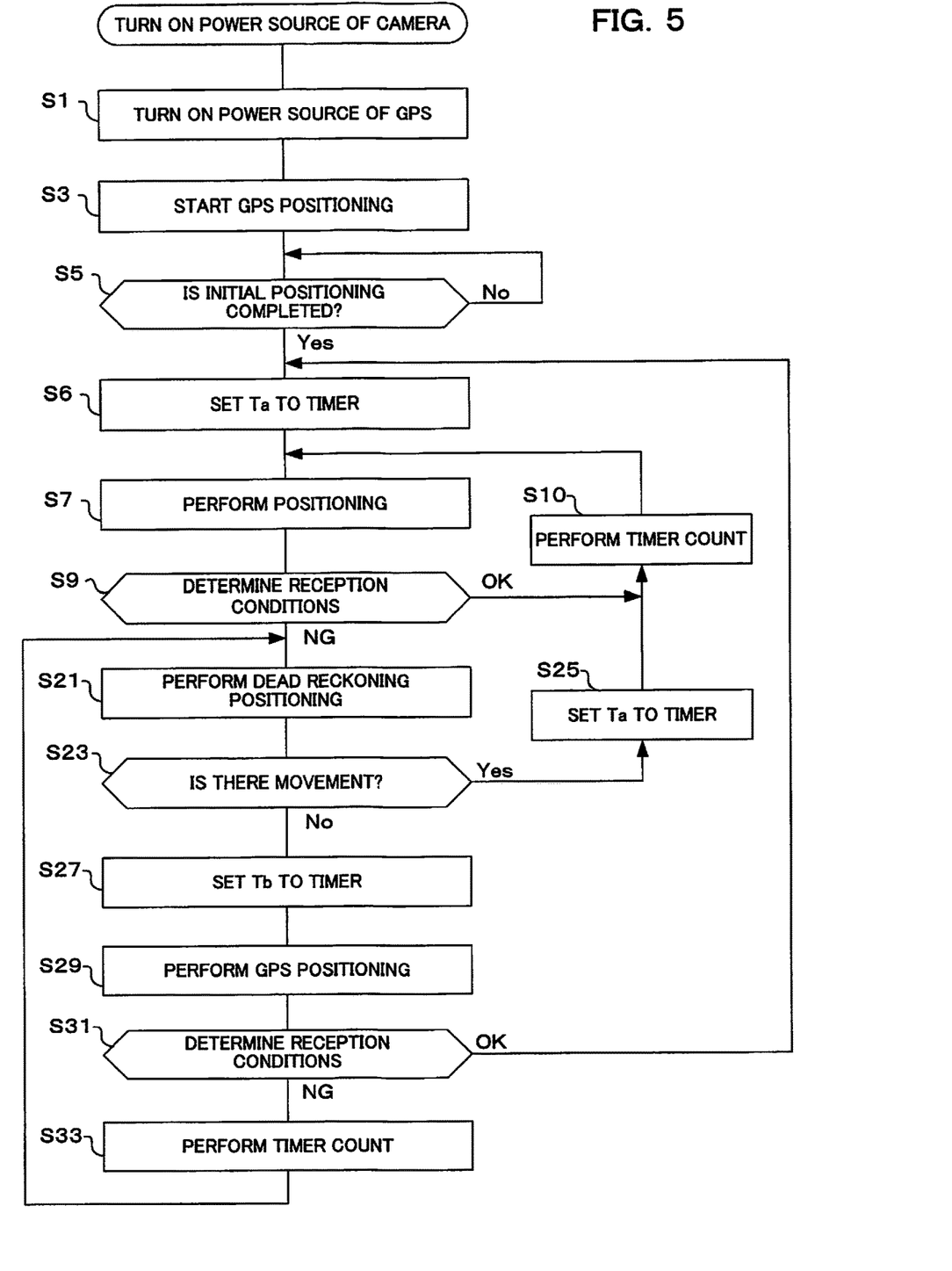
FIG. 5 is a flowchart showing a modification example of the operation of the digital camera according to the embodiment of the present invention.

Further, this camera makes the positioning period of detection of the current position by the GPS (for example, S6 in FIG. 5) differ from the positioning period in a case where it is not possible to detect the current position by the GPS (for example, S27 in FIG. 5). Due to this, power is prevented from being wasted.

Figure 1:
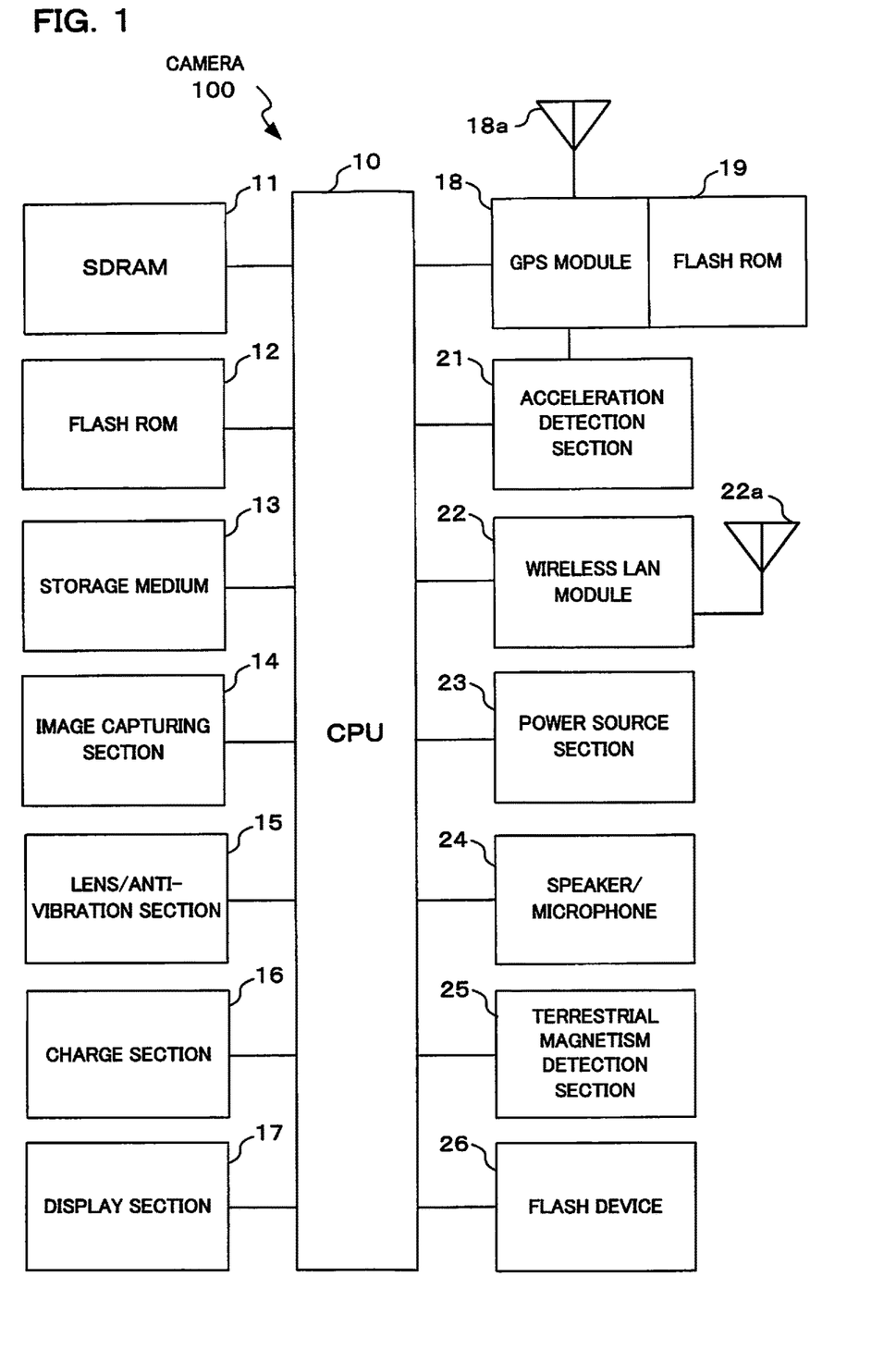
FIG. 1 is a block diagram showing mainly an electric configuration of a digital camera according to an embodiment of the present invention.

FIG. 1 is a block diagram showing mainly an electric configuration of a camera 100 according to an embodiment of the present invention. An SDRAM (Synchronous Dynamic Random Access Memory) 11 is an electrically rewritable volatile memory. The SDRAM 11 temporarily stores image data acquired by an image capturing section 14 and processed by an image processing circuit within a CPU 10.

A flash ROM 12 is an electrically rewritable nonvolatile memory. The flash ROM 12 stores programs for controlling the entire camera 100, data for adjusting the camera 100, and so on. In the SDRAM 11 or a flash ROM 19 to be described later, the current position measured by a GPS module 18 is stored in association with the measurement time. Further, in the SDRAM 11 or the flash ROM 19, the current position detected based on measurement results of an acceleration detection section 21 and a terrestrial magnetism detection section 25 are stored in association with the measurement time. The SDRAM 11 or the flash ROM 19 functions as a memory (storage section) that stores measurement results of a first position measuring circuit or measurement results of a second position measuring circuit in association with the measurement time. A processor (control section) reads the latest measurement result from the memory based on the measurement time (for example, see S19 in FIG. 2). That is, by searching for the latest measurement time from the memory, it is known that the measurement results stored in association with the measurement time are the latest current position.

A storage medium 13 is an electrically rewritable nonvolatile memory and possible to freely attach the storage medium 13 to the main body of the camera 100. The storage medium 13 stores image data acquired by the image capturing section 14 and processed by the image processing circuit within the CPU 10. It is possible to read and reproduce the stored image data on a display section 17.

The image capturing section 14 has an image capturing element, an image capturing control circuit, an image capturing data processing circuit, and so on. The image capturing section 14 performs photoelectric conversion for a subject image formed by a photographing lens and outputs the image data to the CPU 10. A lens/anti-vibration section 15 has a photographing lens and a lens drive mechanism and it is possible for the lens/anti-vibration section 15 to adjust a focus by moving the photographing lens in the direction of the optical axis. Further, the lens/anti-vibration section 15 has an anti-vibration mechanism and removes the influence of camera shake. Specifically, the lens/anti-vibration section 15 detects camera shake of a photographer by the acceleration detection section 21 and moves the photographing lens and/or the image capturing element to the direction opposite to that of the camera shake. Due to this, it is possible to remove the influence of camera shake.

A charge section 16 has a charge circuit, and receives supply of a power source from an external power source and charges a power source section 23. The display section 17 has a liquid crystal monitor, an organic EL monitor, or the like and displays a live-view image, a menu image, a reproduction image, and so on.

The GPS module 18 has a position detecting circuit, and receives an electric wave from a satellite by an antenna 18a and detects the current position (latitude/longitude) based on the received electric wave. The operation of the GPS module 18 is controlled by a built-in CPU (processor). The flash ROM 19 stores the current position (latitude/longitude) detected by the GPS module 18. Further, the flash ROM 19 stores programs of a CPU (processor) incorporated in the GPS module 18. Furthermore, the flash ROM 19 stores the latitude/longitude information, which is arithmetic operation results by dead reckoning positioning using acceleration when it is not possible for the GPS module 18 to perform positioning. Still furthermore, the flash ROM 19 stores in advance map information and is also possible to store map data acquired from the outside. The GPS module 18 functions as the first position measuring circuit (first positioning section) that measures the position of a measuring device by receiving a signal transmitted from a positioning satellite. The flash ROM 19 functions as a memory (storage section) that stores map information.

The acceleration detection section 21 has an acceleration sensor, a sensor such as a gyro, and a processing circuit of a sensor signal, and detects movement (for example, camera shake of a photographer) applied to the camera 100 and outputs to the CPU 10. By performing integration for acceleration twice, it is possible to calculate the movement amount. If a reference position is known, it is possible to detect the current position based on an accumulated value of the movement amount from the reference position and the movement direction to be described later. The acceleration detection section 21 and the terrestrial magnetism detection section 25 function as the second position measuring circuit (second positioning section) that measures the position of each point of the movement path by continuously detecting the movement direction and the movement amount of the measuring device and accumulating the movement direction and the movement amount to the position data of a predetermined point (see S15 in FIG. 2).

A wireless LAN module 22 has a circuit, such as a wireless communication circuit, and performs transmission and reception of data by making use of wireless communication. That is, in a case where the camera 100 moves to a hot spot or the like, it is possible to directly connect to the internet or the like and in a case where the camera 100 is not located in a hot spot or the like, via a smartphone or the like. An antenna 22*a* transmits an electric wave from the wireless LAN module 22 and receives an electric wave from the outside. The wireless LAN module 22 functions as a wireless communication circuit (wireless communication section) that performs wireless communication with an external device.

The power source section 23 has a power source circuit and charges a rechargeable battery by the charge section 16. Further, the power source section 23 supplies a power source to each section within the camera 100 by the rechargeable battery. It is possible for the power source section 23 to switch between supply of a power source to the GPS module 18 and suspension of supply of a power source. The power source section 23 functions as a power source circuit (power source section) that supplies a power source to the first position measuring circuit. A speaker/microphone section 24 has a microphone for collecting voice, a voice processing circuit, a speaker for producing voice, and so on and collects voice around the camera and outputs voice The terrestrial magnetism detection section 25 has a compass or the like, which detects terrestrial magnetism, and a signal processing circuit that processes a terrestrial magnetism signal. By detecting terrestrial magnetism, it is possible to detect the direction in which a user (camera) is moving. A flash device 26 has a flash light emitting section, a flash step-up circuit, a flash light emission control circuit, and so on and irradiates illumination light.

The CPU (Central Processing Section) 10 is a processor and centralizedly controls the entire camera 100 by controlling each section within the camera 100 in accordance with programs stored in the flash ROM 12. Further, the CPU 10 has peripheral circuits, such as an image processing circuit.

The CPU 10 functions as a processor (control section) configured to store measurement results of the first position measuring circuit in the storage section in association with the measurement time. This processor (control section) suspends, in a case of determining that measurement using the first position measuring circuit is not possible (for example, see S9 in FIG. 2), supply of a power source to the first position measuring circuit (for example, see S23 in FIG. 2) in a case of determining that the position of the measuring device is indoors (for example, see S19, S21 in FIG. 2) based on the latest measurement result by the first position measuring circuit and map information.

Further, the processor (control section) measures the position of the measuring device by the second position measuring circuit (for example, see S15 in FIG. 2) in a case of determining that measurement of the first position measuring circuit is not possible (for example, see S9 in FIG. 2). The processor (control section) stores measurement results by the second position measuring circuit in the memory in association with the measurement time (for example, see S15 in FIG. 2) in a case of determining that measurement of the first position measuring circuit is not possible. The processor (control section) supplies a power source to the first position measuring circuit and causes the first position measuring circuit to perform measurement (for example, see S7 in FIG. 2) in a case of determining that the position of the measuring device is outdoors based on measurement results by the second position measuring circuit and map information (for example, see S21 in FIG. 2).

Further, even in a case of measuring the position of the measuring device by the second position measuring circuit (for example, see S15 in FIG. 2), the processor (control section) determines the reception conditions of a signal transmitted from a positioning satellite (for example, S9 in FIG. 2) and resumes the measurement by the first position measuring circuit if the reception conditions become good (for example, see S7 in FIG. 2). The processor (control section) lengthens the period of determining the reception conditions of a signal transmitted from a positioning satellite so as to be longer than the positioning period by the first position measuring circuit (for example, see S13 in FIG. 2).

Further, the processor (control section) refers to the latest measurement result by the first position measuring circuit on the map information through a wireless communication circuit (for example, see S19 in FIG. 2). The processor (control section) reads the latest measurement result from the memory based on the measurement time.

Further, the processor (control section) performs, in a case of determining that the measurement by the first position measuring circuit is not possible in the state where the measurement of the first position measuring circuit is performed at a predetermined period (for example, see S9 in FIG. 5), the measurement of the first position measuring circuit at a second period longer than the predetermined period (for example, see S27, S29 in FIG. 5) in a case of determining that the measuring device is not moving based on the measurement by the second position measuring circuit (for example, see S23 in FIG. 5).

Further, the processor (control section) changes the measurement to the measurement at the predetermined period (for example, see OK at S31→S6 in FIG. 5) in a case where the measurement that was not possible becomes possible in a case where the first position measuring circuit is caused to perform measurement at the second period (for example, see S27, S29 in FIG. 5). The processor (control section) changes the measurement to the measurement at the predetermined period (for example, see S23, S25 in FIG. 5) in a case of determining that the measuring device is moving based on the measurement by the second position measuring circuit in a case where the first position measuring circuit is caused to perform the measurement at the second period (for example, see S27, S29 in FIG. 5).

Next, by using the flowchart shown in FIG. 2, the operation of the position detection in the camera 100 is explained. This flowchart is implemented by the CPU 10 executing a program stored in the flash ROM 12 (this also applies to the flowchart shown in FIG. 5, to be described later).

When the power source of the camera 100 turns on, the flow shown in FIG. 2 starts. First, the power source of the GPS is turned on (S1). At this step, the CPU 10 causes the power source section 23 to supply a power source to the GPS module 18. When the power source of the GPS turns on, the GPS module 18 starts GPS positioning (S3). Here, the GPS module 18 receives an electric wave from a satellite and detects the current position based on the electric wave.

Following the above, whether or not initial positioning is completed is determined (S5). At this step, whether or not the GPS module 18 has completed the first positioning is determined. After the activation of the camera 100, the initial position is settled at least once. In a case where the results of the determination indicate that the first positioning has not been completed yet, the CPU 10 waits until the positioning is completed.

Figure 3A:
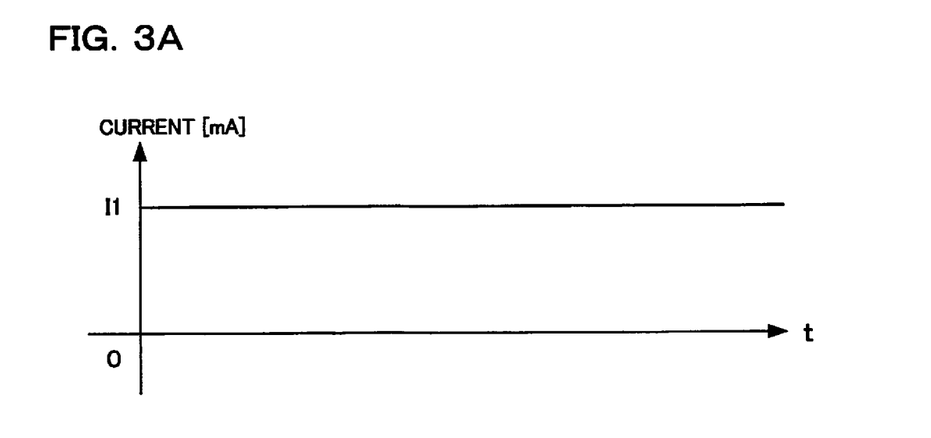
FIG. 3A to FIG. 3C are graphs representing a change in a consumed current in the digital camera according to the embodiment of the present invention.

In a case where the results of the determination at step S5 indicate that the initial positioning is completed, next, continuous positioning is performed (S7). The continuous positioning refers to detecting the current position of the camera 100 at all times by the GPS module 18. Further, during the continuous positioning, the reception intensity from a satellite is measured. During the continuous positioning, the current position measured by the GPS module 18 is stored in the SDRAM 11 or the flash ROM 19 in association with the current time. In the continuous positioning, as shown in FIG. 3A, the consumed current becomes constant at I1 during the continuous positioning. The consumed current I1 only needs to be a current sufficient to cause the GPS module 18 to operate and for example, is about 45 mA.

Following the above, the reception conditions are determined (S9). The GPS module 18 measures the current position based on the electric wave from a satellite, and therefore, when the electric wave from a satellite becomes weak, it is no longer possible to perform the positioning by the GPS. As the case where the electric wave from a satellite becomes weak, there is a case where a user (camera) goes indoors. Further, in a case where the number of satellites from which the electric wave is received becomes two or less because the user (camera) enters a place surrounded by high-rise buildings, or the like, the positioning by the GPS becomes not possible. At this step, based on the reception intensity measured at step S7, the reception state of the electric wave from a satellite is determined. In a case where the results of the determination indicate that the reception conditions are good (OK), the processing returns to step S7 and the continuous positioning is performed.

In a case where the results of the determination at step S9 indicate that the reception conditions are not good (NG), next, whether or not acceleration is detected is determined (S11). At this step, based on the detection results of the acceleration detection section 21, whether or not there is acceleration (a predetermined amount or more of acceleration is produced) is determined. In a case where a user holding the camera 100 is moving, the acceleration detection section 21 detects acceleration. That is, at this step, whether or not the user (camera) is moving or the like is determined.

In a case where the results of the determination at step S11 indicate that acceleration is detected, the positioning period is changed (S13). It is supposed that the results of the determination at step S9 indicate that the reception conditions of the GPS module 18 are not good, but based on the results of the determination at step S11, the user (camera) is moving. That is, the user (camera) is moving, and therefore, there is a possibility that it becomes possible to perform positioning by the GPS in the future. On the other hand, in a case where the state where the GPS module 18 is supplied with power continues, power is wasted. Consequently, at this step, the continuous position measurement by the GPS is suspended and the position measurement by the GPS is performed intermittently at predetermined time intervals.

Figure 3B:
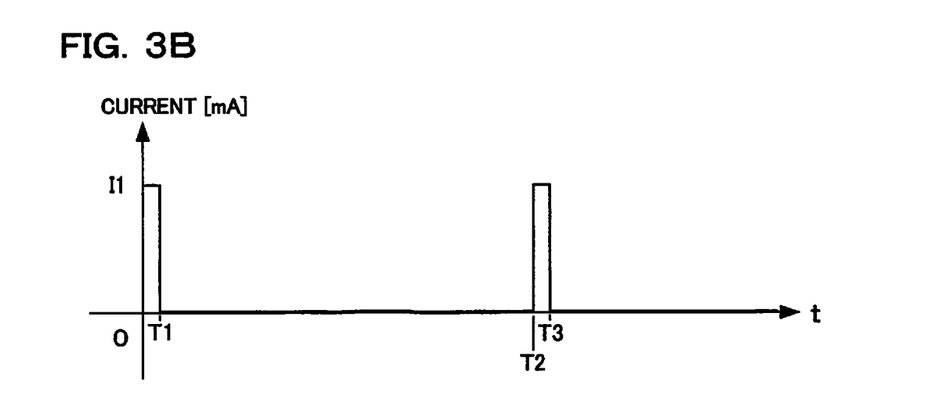

As an example in which the positioning period is changed at step S13, the positioning is performed during the time from 0 to T1, suspended during the time from T1 to T2, and performed during the time from T2 to T3 as shown in FIG. 3B. For example, in a case where the time from 0 to T1 is set to one second, the time from T1 to T2 is set to 29 seconds, and the time from T2 to T3 is set to one second, the positioning of one second is performed by the GPS once in 30 seconds.

In a case where the positioning period is changed at step S13, next, dead reckoning positioning is performed (S15). At this step, based on the terrestrial magnetism detected by the terrestrial magnetism detection section 25, the movement direction of the user (camera) is detected. Further, based on the acceleration detected by the acceleration detection section 21, the movement distance of the user (camera) is detected. It is possible to calculate the movement distance by performing integration for the acceleration twice. If the movement direction and the movement distance of the user (camera) are known, the current position is known. Further, during the dead reckoning positioning, the current position measured based on the output from the acceleration detection section 21 or the like is stored in the SDRAM 11 or the flash ROM 19 in association with the current time. When the dead reckoning positioning is performed, the processing returns to step S9. Consequently, the dead reckoning positioning is continued while the loop of steps S9→S11→S13→S15 is being processed.

In a case where the results of the determination at step S11 indicate that there is no acceleration, wireless communication is turned on (S17). At this step, through the wireless LAN module 22, connection with the internet is established. When the wireless communication is turned on, map data is referred to (S19). At step S7, the current position of the camera is detected based on the GPS and at step S15, the current position of the camera is detected based on the acceleration detection results. At this step S19, where the detected current position of the camera on the map is, is referred to.

When referring to the map data, it may also be possible to transmit the current position of the camera to a map server through the internet and to refer to the map data on the map server. Alternatively, it may also be possible to download map data in the vicinity of the current position from the map server and to refer to current position on the downloaded map data. Further, it may also be possible to store map data in advance in the flash ROM 19 and to refer to the current position on the map data. In this case, it is possible to omit the processing at step S17 and it is not necessary to include the wireless LAN module 22.

When the map data is referred to at step S19, next, whether the current position is indoors or outdoors is determined (S21). In the map data, information on buildings and the like is described, and therefore, based on the current position of the camera on the map, it is possible to determine whether the current position is indoors or outdoors. In a case where the results of the determination indicate that the camera is located outdoors, the processing returns to step S7. In a case where the camera is located outdoors, the possibility of reception of the electric wave from a satellite is high, and therefore, the processing returns to step S7 and the measurement of the current position of the camera is performed by the GPS module 18.

Figure 3C:
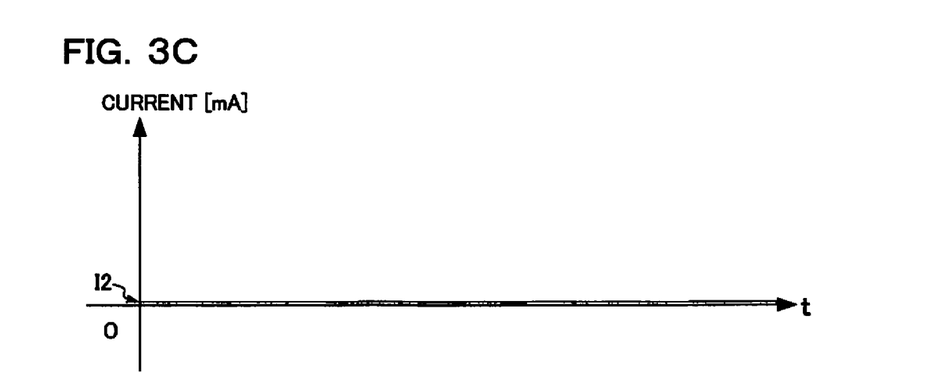

In a case where the results of the determination at step S21 indicate that the camera is located indoors, the power source of the GPS is turned off (S23). The results of the determination indicate that the user (camera) is located indoors, and therefore, even in a case where power is supplied to the GPS module 18, the power is wasted. Consequently, at this step, the power source to the GPS module 18 is turned off or the GPS module 18 is brought into a sleep state. In the example (power source is turned off (reduced)) shown in FIG. 3C, the GPS module 18 is in the sleep state and the consumed current is reduced to a current I2. The current I2 is set to, for example, about 40 µA. In a case where the acceleration detection section 21 detects acceleration (Yes at step S11), at step S13, the GPS module 18 leaves the sleep state and starts positioning.

As described above, the flowchart shown in FIG. 2 has a first positioning step (see S7) of measuring the position of the device by receiving a signal transmitted from a positioning satellite, a power source supply step (see S1) of supplying a power source for performing the first positioning step, and a control step (see S19, S21, S23) of suspending, in a case of determining that measurement at the first positioning step is not possible (see S9), supply of a power source for performing the first positioning step in a case of determining that the position of the device is indoors based on the latest measurement result acquired at the first positioning step and map information. In a case where it is determined that the position of the device is indoors, the supply of a power source is suspended, and therefore, it is possible to reduce power consumption.

Further, in the flowchart shown in FIG. 2, in a case where it is possible to receive an electric wave from a satellite and for the GPS module 18 to perform positioning, the current position is detected continuously (continuous positioning, see S7 in FIG. 2). In this case, a power source sufficient for performing continuous positioning is supplied to the GPS module (see FIG. 3A).

In a case where it is no longer possible to receive an electric wave from a satellite, the current position is detected based on the acceleration detected by the acceleration detection section 21 (dead reckoning positioning, see S15 in FIG. 2). Further, in this case, the GPS module 18 does not perform positioning. However, there is a case where positioning by the GPS becomes possible because of the movement of the user, and therefore, positioning is performed by the GPS by changing the positioning period, that is, at predetermined time intervals (see S13 in FIG. 2, FIG. 3B). By changing the GPS positioning period, it is possible to reduce power consumption.

When the user (camera) suspends movement indoors, there is no longer acceleration detection from the acceleration detection section 21 (No at S11 in FIG. 2). At this point in time, the current position is acquired on the map by referring to the map data by wireless communication (S19 in FIG. 2). As a result of this, in a case where the user (camera) is located outdoors on the map, positioning by the GPS is possible, and therefore, positioning by the GPS is performed (see S21→S7 in FIG. 2). On the other hand, in a case where the user (camera) is located indoors on the map, power is saved by turning off the power source of the GPS module 18 or bringing the GPS module 18 into the sleep state (see S23 in FIG. 2, FIG. 3C).

Figure 4:
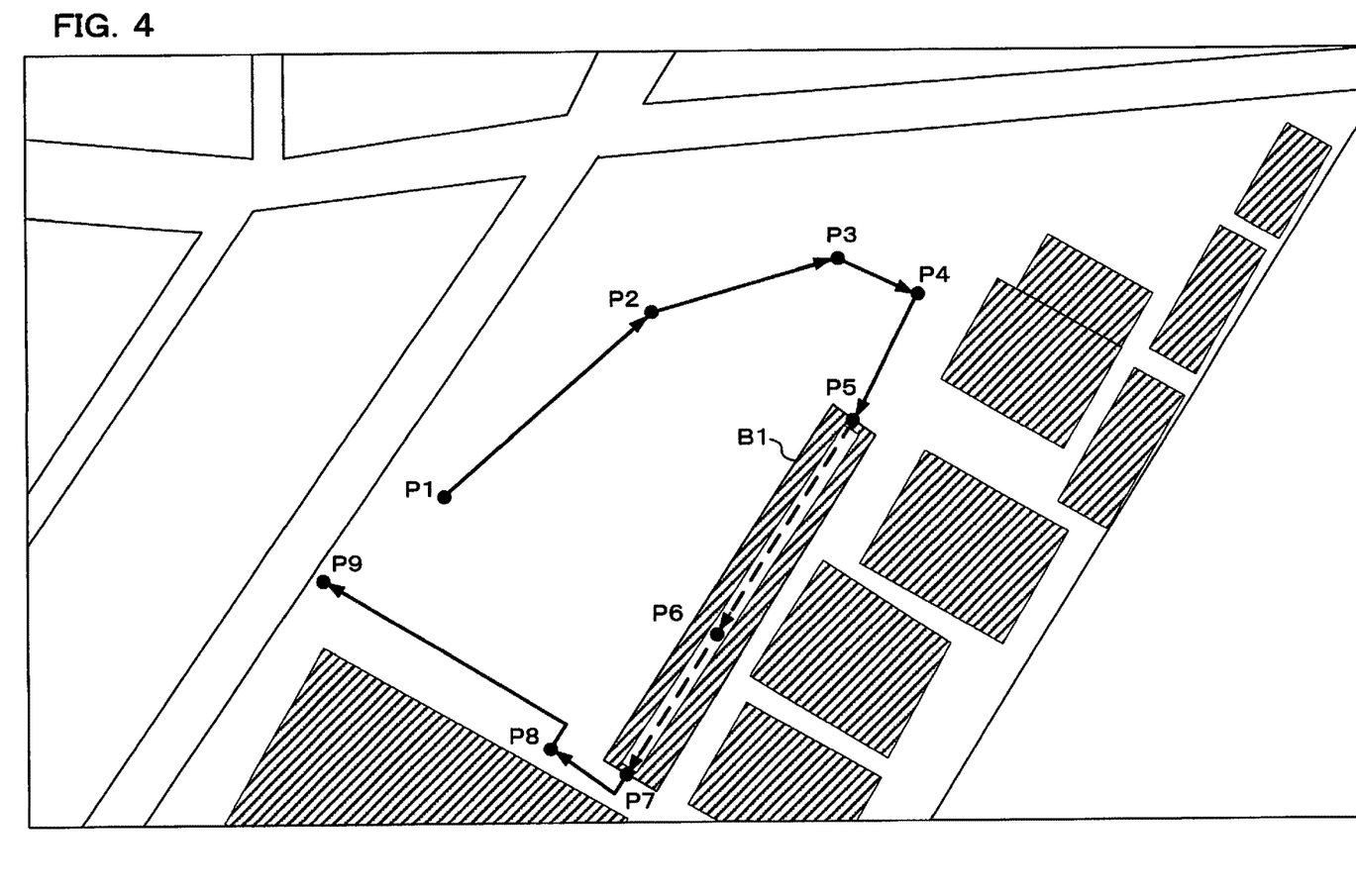
FIG. 4 is a diagram showing an example of an operation in the digital camera according to the embodiment of the present invention at the time of moving indoors and outdoors.

Next, by using the diagram shown in FIG. 4, position detection in a case where a user holding the camera 100 moves outdoors and indoors is explained. FIG. 4 shows a map and the portions to which slashes are attached within the area are buildings. Now, the user holding the camera 100 starts movement from a point P1 and moves to a point P9 through points P2, P3, . . . , P8. In FIG. 4, the solid lines connecting P1 to P5 and P7 to P9 indicate the movement path outdoors. Further, the dotted lines connecting P5 to P7 indicate the movement path inside a building B1. The user (camera) suspends movement at the point P6 and has a rest. After the rest, the user (camera) resumes movement.

The user (camera) moves outdoors from the movement start point P1 to the point P5. Because the user (camera) is located outdoors, it is possible for the GPS module 18 to receive an electric wave from a satellite and the GPS module 18 performs continuous positioning (see S7, OK at S9 in FIG. 2, FIG. 3A).

When the user (camera) enters the inside of the building B1 at the point P5, it is not possible for the GPS module 18 to receive an electric wave from a satellite (see NG at S9 in FIG. 2). Because of this, it is not possible to measure the position by the GPS (non-positioning state). However, in a case where the user (camera) is moving, it is possible for the acceleration detection section 21 to detect acceleration, and therefore, it is possible to measure the position based on the acceleration detection results (dead reckoning positioning at S15 in FIG. 2). In this state, the continuous positioning by the GPS module 18 is not performed but intermittent positioning is performed by changing the positioning period. That is, power is saved by reducing the time of positioning by the GPS (see S13 in FIG. 2, FIG. 3B).

The user (camera) moves from the point P5 to P6 but suspends movement at the point P6. At the point P6, it is not possible for the GPS module 18 to perform positioning because the point P6 is indoors and at the same time, it is not possible for the acceleration detection section 21 to detect movement. The current position when the user (camera) suspends movement at the point P6 is referred to on the map data (see S19 in FIG. 2). Whether or not the position of the user (camera) on the map is indoors is determined (see S21 in FIG. 2) and in a case where the position is indoors, power is saved by turning off the power source of the GPS module 18 or bringing the GPS module 18 into the sleep state (see S23 in FIG. 2, FIG. 3C).

When the user resumes movement at the point P6, acceleration is detected, and therefore, the power source of the GPS module 18 is turned on or the GPS module 18 leaves the sleep state by instructions of the CPU 10 and position measurement is resumed (see S11, S13 in FIG. 2). By the dead reckoning positioning by the acceleration detection section 21, within the building B1, the current position of the user (camera) is measured and intermittent positioning of the GPS (positioning period-changed state) is performed (see loop of S9→Yes at S11→S13→S15→S9 in FIG. 2). However, at this time, the user (camera) is located indoors, and therefore, positioning by the GPS is not possible. When the user (camera) moves out of the building B1 from this state, it is possible to receive an electric wave from a satellite, and therefore, continuous positioning by the GPS is performed (see loop of S7→OK at S9→S7 in FIG. 7). When the user (camera) reaches the point P9, this movement is completed because the point P9 is the goal point.

As described above, in the embodiment of the present invention, by referring to the current position detected by the GPS and the acceleration sensor on the map data, it is possible to grasp the environment (indoors or outdoors) of the current position of the camera (see S19, S21 in FIG. 2). Further, in a case where it is not possible to measure the current position of the camera by the GPS, or in a case where the electric wave from a satellite is weak (see S9 in FIG. 2), power is saved (see FIG. 3B) by detecting the position of the user (camera) by the acceleration sensor (see S15 in FIG. 2) and lengthening the GPS positioning period (see S13 in FIG. 2).

Further, in a case where it is not possible to measure the current position by the GPS, or where the electric wave from a satellite is weak (see S9 in FIG. 2), and where it is not possible to detect the position of the user by the acceleration sensor, the position is checked on the map data and the environment (indoors or outdoors) of the current position is grasped. As a result of this, in a case where the user is located indoors, detection by the GPS is suspended (see S23) until it becomes possible to detect movement of the user by the acceleration sensor, and thus power is saved (see FIG. 3C). The timing of resuming the operation by the GPS from this state is when movement is detected by the acceleration sensor (see S11). In this case, the positioning period is changed (see S13). When the user goes outdoors, the continuous positioning is resumed (see S23→S11→S21→S7).

Next, by using the flowchart shown in FIG. 5, a modification example of the operation of position detection in the camera 100 is explained. In the present modification example, the positioning interval at the time of performing positioning by the GPS is changed. Further, in a case where it is determined that there is no movement by dead reckoning positioning when positioning by the GPS is not possible, the GPS positioning interval is lengthened and thereby power consumption is reduced.

In the flowchart shown in FIG. 5, when the power source of the camera 100 turns on, first, the power source of the GPS is turned on (S1). When the power source of the GPS is turned on, next, GPS positioning is started (S3) and whether or not initial positioning is completed is determined (S5). The processing at steps S1, S3, and S5 is the same as that in the flow shown in FIG. 2, and therefore, detailed explanation is omitted.

When the results of the determination at step S5 indicate that the initial positioning is completed, Ta is set to the timer (S6). Here, the positioning interval Ta at which positioning by the GPS module 18 is performed is set to the timer. When Ta is set to the timer, a timing operation is started.

When Ta is set to the timer, next, positioning is performed (S7). Here, the current position of the camera 100 is detected by the GPS module 18. Note that in FIG. 2, continuous positioning is performed at all times, but in the present modification example, positioning is performed at every positioning interval Ta. However, the positioning interval is a short time interval and it is possible to regard the time interval as being continuous. For example, Ta is set to five seconds.

Following the above, the reception conditions are determined (S9). Here, as in the case with the step S9 in FIG. 2, the reception state of the electric wave from a satellite is determined. In a case where the results of the determination indicate that the reception conditions are good (OK), timer count is performed (S10). Here, whether or not the time Ta set at step S6 has elapsed is determined. In a case where the time Ta has elapsed, positioning is performed at step S7.

On the other hand, in a case where the results of the determination at step S9 indicate that the reception conditions are not good (NG), dead reckoning positioning is performed (S21). Here, as in the case with step S15, based on the terrestrial magnetism detected by the terrestrial magnetism detection section 25, the movement direction of a user is detected. Further, based on the acceleration detected by the acceleration detection section 21, the movement distance of the user is detected. Due to this, it is possible to detect the current position.

When the dead reckoning positioning is performed, next, whether or not there is movement is determined (S23). Here, the determination is performed based on a change overtime in the results of the dead reckoning positioning at step S21.

In a case where the results of the determination at step S23 indicate that there is movement, as in the case with step S6, Ta is set to the timer (S25). When the time Ta is set to the timer, the timing operation is started and in a case where the time Ta has elapsed (see S10), the positioning is performed (see FIG. S7). In a case where the user is moving, there is a possibility that it is possible to perform the positioning by receiving an electric wave from a satellite when the user goes outdoors. Consequently, in the present modification example, even in a case of the dead reckoning positioning, the positioning by the GPS is performed at predetermined time intervals. Note that the time that is set to the timer at step S25 may be different from Ta. If Ta that is set at step S25 is made longer than Ta at step S6, it is possible to further save power by further lengthening the period of the positioning by the GPS module 18.

On the other hand, in a case where the results of the determination at step S23 indicate that there is no movement, Tb is set to the timer (S27). The time Tb is a time longer than the time Ta. For example, Tb is set to 60 seconds. When the time Tb is set, the timing operation is started.

Following the above, the GPS positioning is performed (S29). Here, the GPS module 18 receives an electric wave from a satellite and detects the current position based on the electric wave. When the GPS positioning is performed, next, as in the case with step S9, the reception conditions are determined (S31). Here, the reception state of the electric wave from a satellite is determined. In a case where the results of the determination indicate that the reception conditions are good (OK), the processing returns to step S6 and after the time Ta is set to the timer, the positioning is performed at step S7.

On the other hand, in a case where the results of the determination at step S31 indicate that the reception state is not good (NG), timer count is performed (S33). Here, the timing operation is performed and whether or not the time Tb set at step S27 has elapsed is determined. In a case where the time Tb has elapsed, the processing returns to step S21 and the dead reckoning positioning is performed.

The flowchart shown in FIG. 5 has the first positioning step (S7, S29) of measuring the position of the device by receiving a signal transmitted from a positioning satellite, the second positioning step (S21) of measuring the position of each point of the movement path by continuously detecting the movement direction and the movement amount of the device and accumulating the movement direction and the movement amount in position data of a predetermined point, and the control step (S27, S29) of performing, in a case of determining that the measurement at the first positioning step is not possible in the state where the measurement at the first positioning step is performed at a predetermined period (S9), the measurement at the first positioning step at the second period that is longer in a case of determining that the device is not moving based on the measurement at the second positioning step (S23). Because of this, it is possible to reduce power consumption.

As described above, in the present modification example, in a case where the reception conditions of the electric wave from a satellite are good, the positioning by the GPS is performed at the time Ta intervals (see S6→S7→S9→S10→S7). Further, even in a case where the reception conditions of the electric wave from a satellite are not good, if it is determined that the device is moving by the detection results by the acceleration detection section 21, the dead reckoning positioning and the GPS positioning are performed at the time Ta intervals (loop of S7→S9→S21→S23→S25→S10→S7). In a case where the reception conditions of the electric wave from a satellite are not good and it is determined that the device is not moving by the detection results by the acceleration detection section 21, the dead reckoning positioning and the GPS positioning are performed at the time Tb intervals (loop of S21→S23→S27→S29→S31→S33→S21). Because of this, in the present modification example also, in a case where it is not possible to receive an electric wave from a satellite and the camera (measuring device) is not moving, it is possible to reduce power consumption.

Further, in the preset modification example, the time Ta or Tb is set to the timer and the GPS positioning interval is changed in accordance with the environment. That is, in a case where the GPS reception conditions are not good and the camera (measuring device) is not moving (NG at S9, no movement at S23), the GPS positioning is performed at the longer time intervals than those in a case where the reception conditions are not good but the camera (measuring device) is moving (NG at S9, there is movement at S23). Because of this, in accordance with the environment of the camera 100, it is possible to select an appropriate GPS positioning method, and therefore, it is possible to reduce power consumption.

In the present modification example also, as in the case with the flowchart shown in FIG. 2, in a case where the reception conditions are not good and the camera (measuring device) is not moving (NG at S9, no movement at S23), it may also be possible to determine whether the camera (measuring device) is located indoors or outdoors by referring to the current position of the camera (measuring device) on the map data and to perform processing in accordance with the determination results.

As explained above, in the embodiment and the modification example of the present invention, in a case where it is determined that the measurement using the first positioning section is not possible (for example, see S9 in FIG. 2), the supply of a power source to the first positioning section is suspended (for example, see S23 in FIG. 2) in a case where it is determined that the position of the device is indoors based on the latest measurement result by the first positioning section and the map information (for example, see S21 in FIG. 2). As described above, the environment of the mobile device is checked (that is, whether the mobile device is located indoors or outdoors) and in a case where the mobile device is located indoors, the power source is suspended because it is not possible to receive a signal transmitted from a positioning satellite. Because of this, it is possible to reduce power consumption by taking into consideration the actual environment in which the mobile device is located.

Further, in the embodiment and the modification example of the present invention, in a case where it is determined that the measurement of the first positioning section is not possible in the state where the measurement of the first positioning section is performed at a predetermined period (for example, see S7 in FIG. 5) and it is determined that the device is not moving based on the measurement by the second positioning section (for example, see S23 in FIG. 5), the measurement of the first positioning section is performed at the second period that is longer (for example, see S27, S29 in FIG. 5). As described above, even though the environment of the mobile device is checked (that is, positioning is not possible based on a signal transmitted from a positioning satellite and further, measurement is not possible even based on the movement amount or the like of the mobile device) and currently, it is not possible to receive a signal transmitted from a positioning satellite, there is case where it is possible to receive a signal in the future, and therefore, the positioning period is lengthened. Because of this, it is possible to reduce power consumption by taking into consideration the actual environment in which the mobile device is located.

In the embodiment and the modification example of the present invention, the various functions of the control section are implemented by the CPU 10 executing programs. However, it may also be possible to implement the functions by a hardware configuration in which a hardware circuit that implements these functions, a gate circuit generated based on a programming language described in Verilog, and so on are arranged as the peripheral circuits of the CPU 10, or it may also be possible to make use of a hardware configuration that makes use of software, such as a DSP (Digital Signal Processor). Of course, these may be combined appropriately.

Further, in the embodiment and the modification example of the present invention, explanation is given by using the digital camera as a device for photographing, but as the camera, it may also be possible to use a digital single-lens reflex camera, a mirrorless camera, or a compact digital camera, and further, it may also be possible to use a moving image camera, such as a video camera and a movie camera, and furthermore, it may also be possible to use a mobile telephone, a smartphone, a mobile information terminal, a personal computer (PC), a tablet-type computer, a camera incorporated in a gaming device and the like, a medical camera, a camera for a scientific device, such as a microscope, an automobile-mounted camera, and a surveillance camera.

In the embodiment and the modification example of the present invention, the example is explained in which the measuring device is mounted on the camera 100. However, not limited to a camera, it is possible to apply the present invention to any mobile device capable of moving and acquiring the position information thereon.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A measuring device capable of referring to map information, comprising:
    a first position measuring circuit for measuring a position of the device at a first interval by receiving signals transmitted from positioning satellites;
    a power source circuit for supplying a power source to the first position measuring circuit;
    a processor configured to suspend, in a case of determining that measurement using the first position measuring circuit is not possible, supply of the power source to the first position measuring circuit in a case of determining that a position of the device is indoors based on a latest measurement result by the first position measuring circuit before determining that the measurement using the first position measuring circuit is not possible, and the map information;
    a second position measuring circuit for measuring a position of each point of a movement path by continuously detecting a movement direction and a movement amount of the device and accumulating the movement direction and the movement amount in position data of a reference point,
    wherein the processor is configured to start measurement by the second position measuring circuit as the reference point with the latest measurement result by the first position measuring circuit before determining that the measurement using the first position measuring circuit is not possible in a case of determining that measurement of the first position measuring circuit is not possible,
    wherein the processor is configured to perform measurement by the first position measuring circuit at a second interval that is longer than the first interval by supplying the power source to the first position measuring circuit in a case of detecting movement of the device based on the output of the second position measuring circuit, and
    wherein the processor is configured to perform measurement by the first position measuring circuit at the first interval by supplying the power source to the first position measuring circuit in a case of determining that a position of the device is outdoors based on measurement results by the second position measuring circuit and the map information.

2. The measuring device according to claim 1, wherein the processor is configured to determine, even in a case of measuring a position of the device by the second position measuring circuit, reception conditions of signals transmitted from the positioning satellites and received by the first position measuring circuit at the second interval, and resume measurement by the first position measuring circuit at the first interval responsive to a determination that a current one of the reception conditions reaches a predetermined reception intensity.

3. The measuring device according to claim 1, further comprising:
    a wireless communication circuit for performing wireless communication with an external device, wherein
    the processor is configured to acquire the map information through the wireless communication circuit and refer to the latest measurement result by the first position measuring circuit before determining that the measurement using the first position measuring circuit is not possible.

4. The measuring device according to claim 1, further comprising:
    a memory for storing measurement results of the first position measuring circuit in association with a measurement time, wherein
    the processor is configured to read the latest measurement result by the first position measuring circuit before determining that the measurement using the first position measuring circuit is not possible from the memory based on the measurement time.

5. The measuring device according to claim 1, wherein the processor is configured to turn off the power source to the first position measuring circuit in a case of determining that a position of the device is indoors based on measurement results by the second position measuring circuit and the map information.

6. A measuring method in a measuring device capable of referring to map information, the measuring method comprising:
    performing a first position measurement using a first position measuring circuit to detect a position of the device at a first interval by receiving signals transmitted from positioning satellites;
    supplying a power source to the first position measuring circuit for performing the first position measurement;
    suspending, in a case of determining that the first position measurement is not possible, supply of the power source to the first position measuring circuit for performing the first position measurement in a case of determining that a position of the device is indoors based on a latest measurement result of the first position measurement before determining that the first position measurement by the first position measuring circuit is not possible, and the map information;
    measuring, using a second position measuring circuit, a position of each point of a movement path by continuously detecting a movement direction and a movement amount of the device and accumulating the movement direction and the movement amount in position data of a reference point;
    starting measurement by the second position measuring circuit as the reference point with the latest measurement result by the first position measuring circuit before determining that the measurement using the first position measuring circuit is not possible in a case of determining that measurement of the first position measuring circuit is not possible;

performing measurement by the first position measuring circuit at a second interval that is longer than the first interval by supplying the power source to the first position measuring circuit in a case of detecting movement of the device based on the output of the second position measuring circuit; and performing measurement by the first position measuring circuit at the first interval by supplying the power source to the first position measuring circuit in a case of determining that a position of the device is outdoors based on measurement results by the second position measuring circuit and the map information.

7. The measuring method according to claim 6, further comprising:

determining, even in a case of measuring a position of the device by the second position measurement by the second position measuring circuit, and resuming measurement by the first position measuring circuit at the first interval responsive to a determining that reception conditions of a signal transmitted from the positioning satellites reach a predetermined reception intensity.

8. The measuring method according to claim 6, further comprising:

acquiring the map information through the wireless communication circuit and referring to the latest measurement result by the first position measuring circuit before determining that the measurement using the first position measuring circuit is not possible.

9. The measuring method according to claim 6, further comprising:

storing, in a storage section, results of the first position measurement by the first position measuring circuit, in association with a measurement time; and reading, from the storage section, the latest measurement result before determining that the measurement using the first position measuring circuit is not possible.

10. A non-transitory computer-readable medium storing processor executable instructions which, when executed by at least one processor, perform a measuring method in a measuring device capable of referring to map information, the measuring method comprising:

performing a first position measurement using a first position measuring circuit to detect a position of the device at a first interval by receiving signals transmitted from positioning satellites;

supplying a power source to the first position measuring circuit for performing the first position measurement;

suspending, in a case of determining that the first position measurement is not possible, supply of the power source to the first position measuring circuit for performing the first position measurement in a case of determining that a position of the device is indoors based on a latest measurement result of the first position measurement before determining that the first position measurement by the first position measuring circuit is not possible, and the map information;

measuring, using a second position measuring circuit, a position of each point of a movement path by continuously detecting a movement direction and a movement amount of the device and accumulating the movement direction and the movement amount in position data of a reference point;

starting measurement by the second position measuring circuit as the reference point with the latest measurement result by the first position measuring circuit before determining that the measurement using the first position measuring circuit is not possible in a case of determining that measurement of the first position measuring circuit is not possible;

performing measurement by the first position measuring circuit at a second interval that is longer than the first interval by supplying the power source to the first position measuring circuit in a case of detecting movement of the device based on the output of the second position measuring circuit; and performing measurement by the first position measuring circuit at the first interval by supplying the power source to the first position measuring circuit in a case of determining that a position of the device is outdoors based on measurement results by the second position measuring circuit and the map information.

* * * * *